United States Patent
Spickermann et al.

(10) Patent No.: US 12,460,237 B2
(45) Date of Patent: Nov. 4, 2025

(54) TREHALOSE-RICH YEAST EXTRACT

(71) Applicant: OHLY GmbH, Hamburg (DE)

(72) Inventors: Dominik Spickermann, Hamburg (DE); Mariët van der Werf, Hamburg (DE); Cornelia Reimers, Hamburg (DE); Catharina Kleist, Hamburg (DE)

(73) Assignee: OHLY GmbH, Hamburg (DE)

( * ) Notice: Subject to any disclaimer, the term of this patent is extended or adjusted under 35 U.S.C. 154(b) by 570 days.

(21) Appl. No.: 17/614,707

(22) PCT Filed: May 29, 2020

(86) PCT No.: PCT/EP2020/065065
§ 371 (c)(1),
(2) Date: Nov. 29, 2021

(87) PCT Pub. No.: WO2020/240012
PCT Pub. Date: Dec. 3, 2020

(65) Prior Publication Data
US 2022/0228181 A1    Jul. 21, 2022

(30) Foreign Application Priority Data
May 29, 2019  (EP) .................................... 19177208

(51) Int. Cl.
*C12P 19/12*   (2006.01)
*A23L 2/60*    (2006.01)
(Continued)

(52) U.S. Cl.
CPC ............ *C12P 19/12* (2013.01); *A23L 2/60* (2013.01); *A23L 27/33* (2016.08); *A23L 33/125* (2016.08);
(Continued)

(58) Field of Classification Search
CPC .. C12P 19/12; A23L 2/60; A23L 27/33; A23L 33/125; A23L 33/145; A23L 31/15;
(Continued)

(56) References Cited

U.S. PATENT DOCUMENTS 5,543,513 A * 8/1996 Mandai .................. A23L 11/50
252/194
5,587,290 A * 12/1996 Klionsky ............. C12N 9/2402
435/255.2
(Continued)

FOREIGN PATENT DOCUMENTS

CN  1458278 A * 11/2003
CN  102071150 A * 5/2011
(Continued)

OTHER PUBLICATIONS

Hooper NM. Proteases: a primer. Essays Biochem. 2002;38:1-8. doi: 10.1042/bse0380001. PMID: 12463157. Abstract. Web URL: https://pubmed.ncbi.nlm.nih.gov/12463157/ (Year: 2002).*
(Continued)

*Primary Examiner* — Drew E Becker
*Assistant Examiner* — Luis Eugenio Diou Berdecia
(74) *Attorney, Agent, or Firm* — Knobbe, Martens, Olson & Bear, LLP

(57) ABSTRACT

The present invention relates to a method for preparing a trehalose-rich yeast extract, said method comprising a step in which yeast cells are enzymatically disrupted by use of one or more proteases. The present invention further relates to a novel trehalose-rich yeast extract obtainable by the method of the invention. The novel trehalose-rich yeast extract comprises an amount of at least 15% (w/w) trehalose, based on dry matter. The invention also relates to the use of the novel trehalose-rich yeast extract as an additive in a cosmetic, pharmaceutical, food or beverage product.

20 Claims, 1 Drawing Sheet

US 12,460,237 B2
Page 2

(51) Int. Cl.
| | |
|---|---|
| *A23L 27/30* | (2016.01) |
| *A23L 33/125* | (2016.01) |
| *A23L 33/145* | (2016.01) |
| *A61K 8/60* | (2006.01) |
| *A61K 8/9728* | (2017.01) |
| *A61Q 19/00* | (2006.01) |

(52) U.S. Cl.
CPC .............. *A23L 33/145* (2016.08); *A61K 8/60* (2013.01); *A61K 8/9728* (2017.08); *A61Q 19/00* (2013.01); *A61K 2800/85* (2013.01)

(58) Field of Classification Search
CPC ......... A23L 31/10; A61K 8/60; A61K 8/9728; A61K 2800/85; A61K 2800/10; A61K 2800/805; A23V 2200/132; A23V 2250/218; A23V 2250/636; A23V 2200/328; A23V 2300/10; A23V 2300/24; Y10S 435/942; C12N 1/18; A61Q 19/00
USPC .............................. 426/60–62, 655, 656, 534
See application file for complete search history.

(56) References Cited

U.S. PATENT DOCUMENTS

| | | | | | |
|---|---|---|---|---|---|
| 5,773,282 | A | * | 6/1998 | Tsusaki ................... | C12P 19/12 435/100 |
| 5,807,719 | A | * | 9/1998 | Yoshida ............... | C12N 9/1051 435/100 |
| 5,919,668 | A | * | 7/1999 | Mandai .................. | A23C 9/005 435/97 |
| 5,922,580 | A | * | 7/1999 | Maruta ................... | C07H 1/00 435/253.1 |
| 5,965,412 | A | * | 10/1999 | Nishimoto .............. | C12P 19/18 435/100 |
| 5,993,889 | A | * | 11/1999 | Nakada ................... | C12P 19/18 536/123 |
| 6,146,857 | A | * | 11/2000 | Pauly ...................... | C12P 19/04 435/921 |
| 6,444,448 | B1 | * | 9/2002 | Wheatcroft .......... | A23K 20/163 424/234.1 |
| 6,905,869 | B2 | * | 6/2005 | Gysler ................... | C12N 1/185 435/243 |
| 7,052,724 | B2 | * | 5/2006 | Oshita ...................... | C12N 1/18 426/11 |
| 2011/0250235 | A1 | * | 10/2011 | Saarinen ................. | C12P 19/04 424/278.1 |
| 2014/0099402 | A1 | * | 4/2014 | Noordam ................ | A23L 31/10 426/418 |
| 2018/0320203 | A1 | * | 11/2018 | Rice ........................ | C12N 15/81 |

FOREIGN PATENT DOCUMENTS

| | | | | |
|---|---|---|---|---|
| CN | 103750258 | A * | 4/2014 | ............... A23L 1/09 |
| CN | 104177449 | A * | 12/2014 | |
| CN | 106399423 | A * | 2/2017 | ............. C12P 19/12 |
| EP | 0451896 | A1 * | 10/1991 | ............. C12P 19/12 |
| EP | 0451896 | | 1/1996 | |
| EP | 0693558 | | 12/2002 | |
| JP | H10-505612 | A | 6/1998 | |
| JP | 2002095465 | A * | 4/2002 | |
| JP | 2003-325130 | A | 11/2003 | |
| JP | 2004-107240 | A | 4/2004 | |
| JP | 2013-150585 | A | 8/2013 | |
| JP | 2016-175235 | A1 | 10/2016 | |
| WO | 9509243 | | 4/1995 | |
| WO | WO 95/09243 | A1 * | 4/1995 | ............. C12P 19/12 |

OTHER PUBLICATIONS

Kanji, M., Yumi, Y. (1992). Extraction of Trehalose from Baker's Yeast. In: Furusaki, S., Endo, I., Matsuno, R. (eds) Biochemical Engineering for 2001. Springer, Tokyo. https://doi.org/10.1007/978-4-431-68180-9_156 (Year: 1992).*
The yeast *Saccharomyces cerevisiae*—the main character in beer brewing_Lodolo et al. (2008) FEMS Yeast Research, vol. 8, Issue 7, Nov. 2008, pp. 1018-1036 (Year: 2008).*
International Search Report and Written Opinion in corresponding PCT/EP2020/065065, dated Sep. 24, 2020.
Panek, "Trehalose synthesis during starvation of baker's yeast", Applied Microbiology And Biotechnology, 1975, 2(1), pp. 39-46 (abstract attached).
Grba, et al., "On the formation of glycogen and trehalose in baker's yeast", Applied Microbiology And Biotechnology, 1975, 2(1), pp. 29-37 (abstract attached).
Trevelyan et al., "Studies on Yeast Metabolism, 7. Yeast Carbohydrate Fractions. Separation from nucleic acid, analysis, and behaviour during anaerobic fermentation," The Biochemical Journal, vol. 63, dated Mar. 10, 1955, pp. 23-33.

* cited by examiner

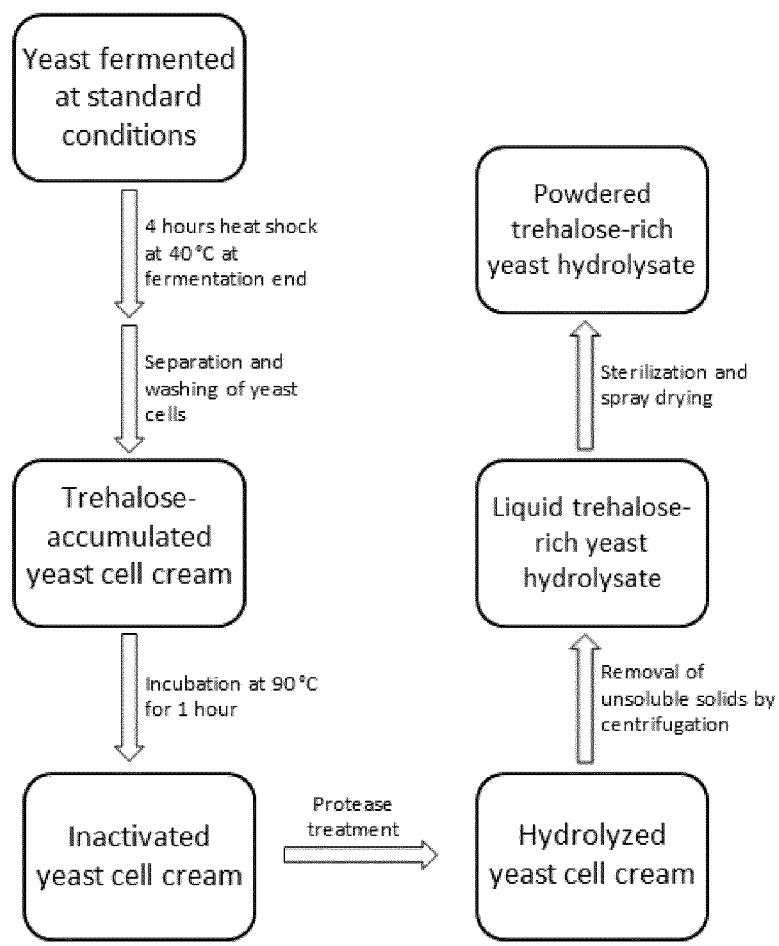

TREHALOSE-RICH YEAST EXTRACT

RELATED APPLICATIONS

This application is the U.S. National Stage of International Patent Application No. PCT/EP2020/065065, filed May 29, 2020, which is hereby incorporated by reference in its entirety, and which claims priority to European Patent Application No. 19177208.6, filed May 29, 2019.

The present invention relates to a method for preparing a trehalose-rich yeast extract, said method comprising a step in which yeast cells are enzymatically disrupted by use of one or more proteases. The present invention further relates to a novel trehalose-rich yeast extract obtainable by the method of the invention. The novel trehalose-rich yeast extract comprises an amount of at least 15% (w/w) trehalose, based on dry matter. The invention also relates to the use of the novel trehalose-rich yeast extract as an additive in a cosmetic, pharmaceutical, food or beverage product.

BACKGROUND OF THE INVENTION

Trehalose, a non-reducing disaccharide of glucose, can be found in many organisms, such as plants, insects, bacteria, and yeast. It acts as a storage carbohydrate and also as a protectant against different forms of stress. Amongst others, trehalose has a stabilizing effect on the plasma membrane and increases resistance of a cell against desiccation, dehydration, temperature changes, and high temperatures.

Although trehalose has only about half the sweetness of sucrose, the sugar is often used as an additive in foods and beverages owing to its favorable characteristics. Trehalose is an antioxidant and acts as a natural preservative, thereby increasing the shelf-life of foods and beverages. Apart from that, it keeps food moist and helps preserve texture and flavor, reduces bitterness and masks off-notes. For these reasons, trehalose is broadly used by the industry as an additive to enhance the quality of foods and beverages.

Different processes for the production of trehalose have been described in the prior art. For example, processes for extracting trehalose from yeast have been described, wherein said processes comprise the accumulation of trehalose in yeast cells and the subsequent extraction of the sugar by $H_2SO_4$ or ethanol. Such extraction processes have been described in Koch & Koch (1925); Stewart et al. (1950); Yoshikawa et al. (1994); Steiner & Cori (1935); Chuanbin et al. (1998); Kanji & Yumi, (1992). Unfortunately, these processes are not only time-consuming, laborious and expensive, but are also associated with a low trehalose yield. In addition, since sugar extraction involves the use of solvents or acids, the environmental burden created by these processes is high. For these reasons, trehalose is nowadays commonly prepared from corn starch using a combination of the enzymes α-1,4-D-glucan phosphorylase and trehalose phosphorylase. However, while being more environmental friendly, these processes are still laborious and expensive which results in high cost.

Accordingly, there is a need for new methods for the production of trehalose-containing compositions that can be used as additives in foods and beverages. The trehalose-containing compositions should be producible in a technically uncomplicated and inexpensive manner without using potentially hazardous substances. In particular, the use of organic solvents should be avoided.

DESCRIPTION OF THE INVENTION

Trehalose, also known as α-D-glucopyranosyl-[1,1]-α-D-glucopyranoside, is a non-reducing disaccharide widely distributed in nature. Trehalose is more stable than sucrose under acid conditions and therefore often used in chewing gum. Although the sweetening capacity is lower compared to sucrose, trehalose is highly preferred in foods because it has only a low influence on blood sugar levels after intake. The structural formula of trehalose is depicted below.

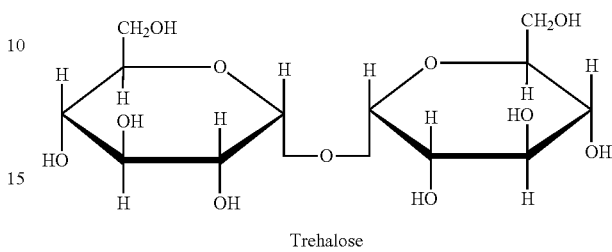

Trehalose

On the one hand, the present invention rests on the insight that a composition comprising a trehalose-rich yeast extract having a trehalose content of at least 15% (w/w) based on dry matter is a particularly advantageous product for numerous applications. On the other hand, the present invention is based on the finding that such extracts can be easily prepared in a reproducible manner by a method as defined herein below.

Thus, in a first aspect, the invention relates to a method for preparing a trehalose-rich yeast extract comprising a trehalose content of at least 15% (w/w) based on dry matter, said method comprising
  (a) fermenting yeast cells in a suitable medium;
  (b) subjecting the yeast cells to abiotic stress;
  (c) subjecting the yeast cells to a temperature of at least 70° C. to inactivate yeast enzymes;
  (d) incubating the yeast cells with at least one protease or peptidase enzyme; and
  (e) removing non-soluble cell components after peptidase treatment; and
  (f) obtaining the trehalose-rich yeast extract.

In the first step of the above method, yeast cells are fermented in a suitable medium. Culture media and methods for fermenting yeast are well known in the art and are commercially available from different manufacturers. Suitable media comprise, for example, the YPD medium of Sigma Aldrich (Taufkirchen, Germany). Numerous other culture mediums are commercially obtainable from different manufacturers.

The yeast cells can be cultured under standard conditions known in the art. For example, the cells can be normally cultured at a temperature between 25-35° C. in flasks. Culturing can be continued under agitation until a predetermined cell density is reached. The cell density is preferably measured by the optical density at 600 nm (OD600). It is preferred that the cells are cultured to an OD600 of 0.8 to 1.0 before subjecting the cells to abiotic stress.

The type of yeast that can be used in the method of the invention is not particularly limited. Suitable yeast cells may comprise, for example, a yeast belonging to the genus *Saccharomyces*, such as *S. cerevisiae*, *S. chevalieri*, *S. boulardii*, *S. bayanus*, *S. italicus*, *S. delbrueckii*, *S. rosei*, *S. microellipsodes*, *S. carlsbergensis*, *S. bisporus*, *S. fermentati*, *S. rouxii*, or *S. uvarum*; a yeast belonging to the genus *Schizosaccharomyces*, such as *S. japonicus*, *S. kambucha*, *S. octosporus*, or *S. pombe*; a yeast belonging to the genus *Hansenula*, such as *H. wingei*, *H. arni*, *H. henricii*, *H.*

*americana, H. canadiensis, H. capsulata*, or *H. polymorpha*; a yeast belonging to the genus *Candida*, such as *C. albicans, C. utilis, C. boidinii, C. stellatoidea, C. famata, C. tropicalis, C. glabrata*, or *C. parapsilosis*; a yeast belonging to the genus *Pichia*, such as *P. pastoris, P. kluyveri, P. polymorpha, P. barkeri, P. cactophila, P. rhodanensis, P. cecembensis, P. cephalocereana, P. eremophilia, P. fermentans*, or *P. kudriavzevii*; a yeast belonging to the genus *Kluyveromyces*, such as *K. marxianus*; and a yeast belonging to the genus *Torulopsis*, such as *T. bovina*, or *T. glabrata*.

In a preferred embodiment, the yeast cells which are fermented in step (a) of the above method belong to the genus *Saccharomyces*. In one particularly preferred embodiment, the yeast cells belong to the species *S. cerevisiae*.

If the extract resulting from the above method is intended for use in food items, one may optionally wash the cells after step (a) or (b) with an alkaline buffer, such as a sodium hydroxide buffer. Such washing step is useful to reduce the taste of the yeast extract resulting from the process. If the method of the invention includes a washing step with an alkaline buffer, at least one subsequent washing step with water is included into the method to ensure that residual alkaline buffer is removed. For example, if the yeast cells are washed with a certain volume of alkaline buffer, it is subsequently washed with twice the volume of water.

After a sufficient cell density has been reached, normally an OD600 of 1.0, the yeast cells are subjected to abiotic stress in step (b) of the method. Abiotic stress may include the incubation of the cells at high or low temperatures, the addition of potentially toxic compounds like ethanol, or the application of hyperosmotic conditions in the medium, such as high salt or sugar concentrations. In one particularly preferred embodiment, the abiotic stress in step (b) is applied by incubation of the cells to high temperatures. This can be achieved by increasing the temperature of culturing at the end of the fermentation period. In a preferred embodiment, the culturing temperature is increased by 5° C. or more, 10° C. or more of 15° C. or more.

In a particularly preferred embodiment, the yeast cells are cultured in step (a) of the above method at a temperature of 25° C. to 35° C. until the desired density has been reached, and the temperature of the yeast culture is then increased by 10° C. to a stress temperature between 35° C. to 45° C. In an even more preferred embodiment the yeast cells are cultured at a temperature of about 30° C. in step (a) of the above method and then shifted to a stress temperature of 40° C. The increased stress temperature will be maintained for at least 30 minutes, 60 minutes, 90 minutes, 120 minutes, 150 minutes, 180 minutes, 210 minutes, 240 minutes, 270 minutes or 300 minutes. In one embodiment, the stress temperature is 40° or more and will be maintained during step be of the above method for 240 minutes or more.

In subsequent step (c) the yeast cells are then subjected to a temperature of at least 70° C. in order to inactivate yeast enzymes that would catalyze the breakdown of the trehalose molecules accumulated in the cells. During this step, the temperature can be, for example, about 75° C., about 80° C., about 85° C., about 90° C., about 95° C. or even higher. The incubation of the yeast cells at the enzyme inactivation temperature will preferably be performed for at least 10 minutes, at least 20 minutes, at least 30 minutes, at least 60 minutes or longer. Incubation at a temperature of at least 70° C. for at least 60 minutes is particularly preferred. in some embodiments, the enzyme inactivation temperature may be maintained for more than 60 minutes, for example for at least 90 minutes, 120 minutes, 150 minutes, 180 minutes, 210 minutes, 240 minutes, 270 minutes or 300 minutes. Incubation at a temperature of at least 90° C. for 1-4 hours is particularly preferred. Incubation at a temperature of at least 90° C. for 2-3 hours is even more preferred.

After enzyme inactivation, the yeast cells are lysed in step (d) of the above method. For this purpose, the yeast cells obtained from step (c) of the above method are incubated with at least one peptidase enzyme that is effective in disintegrating the cell walls of the yeast cells. As used herein, the term "peptidase" means a proteolytically active enzyme that catalyzes the degradation of a protein or peptide. The term is meant to include both peptidases and proteases.

Suitable peptidases for use in the method of the invention include both endopeptidases and exopeptidases. As used herein, an "endopeptidase" means any enzyme that is capable of degrading an internal peptide bond in a protein or peptide. In contrast, an "exopeptidase" is an enzyme that is capable of degrading a peptide bond located at one of the termini of a protein or peptide.

In a preferred embodiment, lysis in step (d) of the above method includes the use of at least one endopeptidase. In another preferred embodiment lysis in step (d) of the above method includes the use of at least one exopeptidase. In another preferred embodiment lysis in step (d) of the above method includes the use of at least one endopeptidase and at least one exopeptidase. For example, lysis includes the use of a mixture of an endopeptidase and an exopeptidase. For example, lysis of the yeast cells in step (d) of the above method may be achieved by the addition of an enzyme mix containing both an endopeptidase and an exopeptidase.

The peptidase enzymes to be used in the process of the present invention can be derived from different sources. For example, the peptidase may be derived from a fungal, plant, or animal source. Examples for commercially available peptidases comprise Flavourzyme® (Novozymes A/S), ProteAX (Amano Enzyme Inc.), ProHydrolase (Deerland Enzymes Inc.), Sumizyme LPL-G (Shin Nihon Chemical CO., LTD.), FlavorPro 795 MDP (Biocatalysts Ltd.), FoodPro Alkaline Protease (Danisco A/S), or others. Other enzymes offered by different manufacturers can be used as well.

Preferably, peptidase incubation is performed at a dry matter content of about 4-20%, preferably about 6-18%, and more preferably to about 8-16%. The dry matter content of a composition, such as a yeast cell culture, can be determined in accordance with standard procedures using commercially available devices, for example, the Moisture Analyzer (Mettler-Toledo GmbH, Gießen, Germany). Once the dry matter content of a starting yeast cell culture has been determined, it can be adjusted to a predetermined value either by diluting or concentrating the culture.

Depending on the peptidase selected for the decomposition of the yeast cell proteins, it may be necessary to adjust an appropriate pH of the mixture so as to provide for optimum conditions for the enzymatic break down of the proteins. Depending on the peptidase, step (d) can be conducted at conditions ranging from pH 3-10, preferably in the range of pH 4-9.

The peptidase or peptidase mixture can be added to the yeast cell suspension in a concentration of between 0.1 and 5.0% (w/w) peptidase per total dry matter of the composition. Preferably, the concentration is between 0.2 and 4.0% (w/w) peptidase per total dry matter of the composition, more preferably between 0.3 and 3.0%, such as 2.0%. The yeast cells are incubated with the peptidase or peptidase mixture under conditions that allow cell wall protein decomposition. These conditions will preferably comprise a temperature between about 30-65° C., more preferably between about 40-60° C., such as 50-55° C.

The reaction time will depend on several factors, e.g. the cell density by the time of enzyme addition, the amount of enzymes added, and incubation temperature. The incubation time can be between 30 minutes and 24 hours, but it will normally be in the range of between 1-12 hours, such as between 2-8 hours, or most preferably between 4-6 hours. The optimum conditions can be identified by the skilled person by routine experiments.

After the yeast cells have been disrupted by the peptidase treatment, the soluble fraction is separated from the insoluble fraction in step (e) of the above method. The insoluble fraction mainly contains cell wall components, cell organelles and unlysed cells. The separation of the soluble from the insoluble fraction can be performed by different methods, including centrifugation, filtration, and other methods.

In a simple embodiment, the cell lysate containing the disrupted yeast cells, either diluted or not, is subjected to centrifugation, for example, at 2,000 to 25,000 g to sediment the insoluble matter. The supernatant containing the soluble cell components, including the accumulated trehalose, is obtained and preferably cooled to below 20° C. until further use. Alternatively, the removal of insoluble matter can be effected by standard filtration using a filter material that retains said insoluble compounds. For example, a dead-end filtration using filters with pore sizes ≤3 μm may be carried out. Also possible are cross flow or tangential flow filtrations to avoid blocking or fouling of the filter. In all cases, the filter pore size must be smaller than 3 μm to hold back yeast cells and cell debris.

In step (f) of the above method, the trehalose-rich yeast extract is obtained and can optionally be further processed. For example, the yeast extract may be sterilized or dried. In one preferred embodiment, the aqueous extract is sterilized. Sterilization can be affected by heat treatment, by UV irradiation, or by other common techniques. For example, sterilization can be achieved by filtering the aqueous phase through a filter having a pore size of 0.22 μm or less.

In a particular preferred embodiment, the process of the invention, i.e. the process as defined above by steps (a)-(f), does not involve any organic solvents like ethanol or propanol, or acids like sulfuric acid. In particular, the process of the invention does not involve a trehalose extraction step that makes use of any organic solvents or acids.

In another preferred embodiment, the aqueous extract is dried. Drying of the extract can be effected, for example, by freeze-drying or spray-drying. The principle of spray-drying is based on the dispersion of a solution into fine droplets which are introduced into a flow of hot air. The solvent evaporates from the substrate droplets so that dry product clusters remain. Standard spray drying devices can be used, such as the Mini Spray Dryer B-290 from Büichi Labortechnik GmbH (Essen, Germany) or the Mobile Minor™ Spray Dryer from GEA (Berlin, Germany).

Freeze drying or lyophilization is a process which removes water from a product to extend shelf life. Freeze drying encompasses freezing the product and reducing the pressure to allow the frozen water in the material to sublimate. Various methods can be applied for freezing the product. For example, freezing can be achieved by using a standard freezer or a chilled bath. Cooling the product below its triple point ensures that sublimation will occur upon heating. To prevent the formation of large crystals that may damage the structure of the product to be dried, freezing is done rapidly. About 95% of the water in the product is removed when the frozen water sublimates. Most materials can be dried to 1-5% residual moisture. Standard freeze drying devices can be used, such as the Lyovac™ devices from GEA (Berlin, Germany), the Gamma 2-20 Freeze dryer LCM-1 from Christ (Osterode am Harz, Germany), or the Christ Martin™ Alpha 1-2 Lyophilisator from Fisher Scientific GmbH (Schwerte, Germany).

In another aspect, the invention provides a trehalose-rich yeast extract which is obtainable by a method as described above, i.e. a method comprising steps (a) to (f). The extract comprises a trehalose content of at least 15% (w/w) based on dry matter. Preferably, the trehalose content is at least 30%, at least 35%, at least 40%, or at least 45% (w/w) based on dry matter. The extract does not include any externally added sugar, in particular no externally added trehalose. This means that the complete amount of trehalose in the extract is derived from the yeast cells. The trehalose content is preferably measured by the "Trehalose Assay Kit" of Megazyme, Wicklow, Ireland.

In yet another aspect, the invention provides a trehalose-rich yeast extract comprising a trehalose content of at least 15%, at least 20%, at least 25% (w/w) based on dry matter. Preferably, the trehalose content is at least 30%, at least 35%, at least 40%, or at least 45% (w/w) based on dry matter. For example, the trehalose content can be at least at least 16%, at least 17%, at least 18%, at least 19%, at least 20%, at least 21%, at least 22%, at least 23%, at least 24%, at least 25%, at least 26%, at least 27%, at least 28%, at least 29%, or at least 30% (w/w) based on dry matter. The protein content of the extract is at least 20%, at least 25%, at least 30%, or at least 40% (w/w) based on dry matter. The extract does not include any externally added sugar, in particular no externally added trehalose. This means that the complete amount of trehalose in the extract is derived from the yeast cells.

The trehalose-rich yeast extracts of the invention preferably comprise an RNA content of between 1-30% (w/w) based on dry matter, such as between 2-25% (w/w), between 3-20% (w/w), between 4-15% (w/w), between 5-10% (w/w), or between 6-8% (w/w). The yeast extracts of the invention preferably further comprise NaCl in an amount of between 0.1-5% (w/w) based on dry matter, such as between 0.2-4% (w/w), between 0.5-2.5% (w/w), or between 1-2% (w/w). The fat content of the trehalose-rich yeast extracts of the invention preferably is between 1-10% (w/w) based on dry matter, such as between 2-7% (w/w), or between 3-5% (w/w). The ash content of the yeast extracts of the invention preferably is between 1-20% (w/w) based on dry matter, such as between 3-15% (w/w), between 5-10% (w/w), or between 6-8% (w/w).

The trehalose-rich yeast extracts are further characterized by a high protein content. The protein content of the extracts is at least 20%, at least 25%, at least 30%, or at least 40% (w/w) based on dry matter. The protein content is preferably determined by the standard method of Kjeldahl, e.g. by using the Kjeltec™ 8400 device (FOSS GmbH, Hamburg, Germany.

In a particular preferred embodiment, the trehalose-rich yeast extracts of the invention comprise:
 (a) a trehalose content of at least 20%, more preferably at least 25% (w/w) based on dry matter; and
 (b) a protein content of at least 20%, more preferably at least 25% (w/w) based on dry matter; and
 (c) a fat content of between 1-10% (w/w) based on dry matter; and
 (d) an RNA content of between 1-30% (w/w) based on dry matter.

In yet another aspect, the invention provides a pharmaceutical composition, a cosmetic composition, a food product or a beverage product comprising a trehalose-rich yeast extract as described herein. Preferably, these compositions and products do not contain any trehalose from a source other than the trehalose-rich yeast extract.

Cosmetic compositions which be supplemented with a trehalose-rich yeast extract described herein may include syrups, such as cough syrups, and tablets.

Cosmetic compositions which be supplemented with a trehalose-rich yeast extract described herein may include skin care gels, lotions or creams. In these compositions, trehalose may support skin penetration of the compositions.

The food or beverage products, to which the trehalose-rich yeast extract may be added, are not particularly limited. In principle, all different types of food or beverage products can be optimized by the addition of the trehalose-rich yeast extract described elsewhere herein. Suitable food products to which the trehalose-rich yeast extract may be added include but are not limited to dairy products (e.g. yoghurts), baked goods (e.g., bread, biscuits), puddings, fruit preparations, tomato ketchups, sauces, condiments, ice creams, breakfast cereals, chocolates, candy, fruit or wine gums, confectionaries, cakes, jams and jellies, chocolate or hazelnut spreads, and the like.

Beverages to which the trehalose-rich yeast extract may be added include but are not limited to flavored water, fruit punch, dairy-based beverages, e.g. drinking yoghurts, buttermilk, kefir, fruit juices, lemonades, energy and sport drinks, teas, e.g., iced tea, sweet tea, instant tea, and ready-to-drink tea, coffees, e.g., iced coffee, flavored coffee, instant coffee, and ready-to-drink coffee, soy-based beverages, milk drinks, e.g. flavored milk drinks (e.g. vanilla-, chocolate-, or strawberry-flavored), sweetened powdered drinks, caffeinated or caffeine-free soft drinks, and the like. In a particular preferred embodiment, the product to which the trehalose-rich yeast extract is added is a milk drink, preferably a soy milk drink.

The food or beverage products may include additional components which are frequently used in the field of food and nutrition technology. For example, the food or beverage products may comprise other sweeteners, such as glucose, maltose, sucrose, lactose, aspartame, saccharin, sucralose, or sugar alcohols. The compositions may also comprise vitamins or flavors, such as orange, vanilla, lemon, or strawberry flavors. Other common additives include coloring agents, emulsifiers, stabilizers, texturizers, preservatives, antioxidants, thickeners, and the like.

In a final aspect, the invention relates to the use of a yeast extract as described herein as an additive in a cosmetic, pharmaceutical, food or beverage product.

BRIEF DESCRIPTION OF THE FIGURES

FIG. 1 shows a schematic overview of a preferred embodiment for preparing a trehalose-rich yeast extract powder according with the invention and prepared in accordance with Example 1 described herein below.

EXAMPLE

The following example is provided in order to illustrate the invention. It should however be understood that the scope of the invention is not limited by the example. A skilled person will understand that several modifications can be made without deviating from the scope of the invention.

Example 1: Preparation of a Trehalose-Rich Yeast Extract

*S. cerevisiae* strain ATCC 204508 was grown in YPD medium (1% yeast extract, 2% peptone, and 2% glucose) overnight at 30° C. Next morning, fresh YPD-medium was added to the yeast cells to provide an OD600 of 0.1. The cells were cultured at 30° C. until an OD600 of 1.0 was reached. Subsequently, the exponentially growing yeast cell culture was subjected to a heat shock by increasing the growth temperature from 30° C. to 40° C. for 4 hours. The yeast cells were harvested using standard separators and washed twice with water.

In this way, a yeast cell substrate having a dry matter of about 18% and a trehalose concentration of about 9% (w/w) based on dry matter was obtained. The yeast substrate was heated to 90° C. for 1 hour to inactivate inherent yeast enzymes. Afterwards, a peptidase was added (Corolase 7089, AB Enzymes GmbH, Darmstadt, Germany) at a concentration of 0.5% (w/w) based on dry matter yeast substrate. The dry matter content was determined using a Moisture Analyzer (Mettler-Toledo GmbH, Gießen, Germany).

The hydrolysis reaction was incubated at 55° C. for 3 hours under vigorous stirring. The pH was maintained at pH 7 using a 10% sodium hydroxide solution. The hydrolyzed mixture was then separated using a standard lab centrifuge (10 minutes, 4700 g, room temperature, Heraeus Multifuge X3R, ThermoFisher Scientific). The solid pellet was removed to gain the aqueous trehalose-rich yeast extract.

In order to get a dried and powdered product, the aqueous phase was then sterilized by heating to 90° C. for 30 minutes, and spray-dried using a Mini Spray Dryer B-290 from Büchi Labortechnik GmbH (Essen, Germany) with a constant input temperature between 133-136° C. and output temperature at 93±2° C. The final powdered product was analyzed for its trehalose content resulting in a concentration of 25.3% (w/w) trehalose of dry matter.

The invention claimed is:

1. A method for preparing a trehalose-rich yeast extract comprising a trehalose content of at least 15% (w/w) based on dry matter, said method comprising
   (a) fermenting yeast cells in a suitable medium;
   (b) subjecting the yeast cells to abiotic stress;
   (c) subjecting the yeast cells to a temperature of at least 70° C. to inactivate yeast enzymes;
   (d) incubating the yeast cells with a least one peptidase enzyme;
   (e) removing non-soluble cell components after peptidase treatment; and
   (f) obtaining the trehalose-rich yeast extract,
   wherein the method does not include a trehalose extraction step that makes use of any organic solvents or acids.

2. The method of claim 1, wherein the yeast cells belong to the genus *Saccharomyces*.

3. The method of claim 1, wherein step (b) includes culturing the yeast cells at an increased temperature.

4. The method of claim 1, wherein peptidase treatment in step (d) includes incubation with at least one endopeptidase and/or at least one exopeptidase.

5. The method of claim 1, wherein peptidase treatment in step (d) is carried out at a pH of 4-9.

6. The method of claim 1, wherein removing non-soluble cell components after protease or peptidase treatment in step (e) includes centrifugation.

7. The method of claim 1, wherein said method further comprises drying the trehalose-rich yeast extract obtained in step (f).

8. The method of claim 1, wherein step (b) includes culturing the yeast cells at a temperature of at least 40° C.

9. The method of claim 1, wherein step (c) includes incubating the yeast cells at a temperature of at least 75° C.

10. The method of claim 1, wherein step (c) involves incubating the yeast cells for more than 60 minutes.

11. The method of claim 1, wherein the method prepares a Trehalose-rich yeast extract comprising a trehalose content of at least 20% (w/w).

12. The method of claim 1, wherein the method prepares a Trehalose-rich yeast extract comprising a trehalose content of at least 40% (w/w).

13. The method of claim 1, wherein the method prepares a Trehalose-rich yeast extract comprising a fat content between 1-10% (w/w).

14. The method of claim 1, wherein the method prepares a Trehalose-rich yeast extract comprising a protein content of at least 20% (w/w).

15. The method of claim 1, wherein the method prepares a Trehalose-rich yeast extract comprising an RNA content between 1-30% (w/w).

16. The method of claim 1, further comprising adding the Trehalose-rich yeast extract as an additive to a pharmaceutical, cosmetic, food or beverage product.

17. A method of making a Trehalose-rich yeast extract additive for a pharmaceutical, cosmetic, food or beverage product, comprising:
   (a) fermenting yeast cells in a suitable medium;
   (b) subjecting the yeast cells to abiotic stress;
   (c) subjecting the yeast cells to a temperature of at least 70° C. to inactivate yeast enzymes;
   (d) incubating the yeast cells with a least one peptidase enzyme;
   (e) removing non-soluble cell components after peptidase treatment;
   (f) obtaining the trehalose-rich yeast extract, wherein the method does not include a trehalose extraction step that makes use of any organic solvents or acids; and
   (g) preparing the extract as a Trehalose-rich yeast extract additive to a pharmaceutical, cosmetic, food or beverage product.

18. The method of claim 17, further comprising adding the Trehalose-rich yeast extract additive to a pharmaceutical, cosmetic, food or beverage product.

19. The method of claim 17, wherein the peptidase treatment in step (d) is carried out at a pH of 4-9.

20. The method of claim 17, wherein the method prepares a Trehalose-rich yeast extract additive comprising a trehalose content of at least 20% (w/w).

* * * * *